United States Patent [19]

Mariani

[11] Patent Number: 5,577,187
[45] Date of Patent: Nov. 19, 1996

[54] METHOD AND SYSTEM FOR TILING WINDOWS BASED ON PREVIOUS POSITION AND SIZE

[75] Inventor: Rico Mariani, King County, Wash.

[73] Assignee: Microsoft Corporation, Redmond, Wash.

[21] Appl. No.: 247,043

[22] Filed: May 20, 1994

[51] Int. Cl.$^6$ ........................................................ G06F 3/00
[52] U.S. Cl. ............................................................ 395/342
[58] Field of Search .................................... 395/155–161; 345/117–120; 348/564–567

[56] References Cited

U.S. PATENT DOCUMENTS

| | | | |
|---|---|---|---|
| 5,060,170 | 10/1991 | Bourgeois et al. | 395/158 |
| 5,371,847 | 12/1994 | Hargrove | 395/157 |
| 5,377,317 | 12/1994 | Bates et al. | 395/157 |
| 5,390,295 | 2/1995 | Bates et al. | 395/157 |
| 5,487,143 | 1/1996 | Southgate | 395/157 |

OTHER PUBLICATIONS

*Microsoft*™ *Windows® Version 3.1 User's Guide for the Microsoft Operating System,* Chapter 3, "What is Program Manager?", Microsoft Corporation, 1990–1992, pp. 71–76.

Giglio, "Microsoft Corp.—Company Report", Jul. 14, 1989, p. 2.

Microsoft Windows User's Guide, vl.o, Microsoft Corp., 1985, pp. 17–28, 42–52.

Cohen et al, "Automatic Strategies in the Siemens RTL Tiled Window Manager", IEEE, 1988, pp. 111–119.

Myers, "A Taxonomy of Window Manager User Interfaces", IEEE, 1988, pp. 65–84.

Cohen et al, "Constraint Based Tiled Windows", 1st Int. Conf. on Comp. Workstations, Nov. 1984, pp. 2–11.

*Primary Examiner*—Kee Mei Tung
*Assistant Examiner*—John E. Breene
*Attorney, Agent, or Firm*—Seed and Berry LLP

[57] ABSTRACT

A computer method and system tiles display windows on a computer screen in a fashion that approximately maintains the relative position and size of the display windows as they were before being aligned. Each display window on the computer screen is assigned to a line based on a location of the display window to create one or more linear sections of display windows. The linear sections are arranged to span the computer screen. The display windows assigned to each linear section are arranged to fill the linear section. In one embodiment, the linear sections are horizontal rows and in another embodiment the linear sections are vertical columns.

47 Claims, 12 Drawing Sheets

METHOD AND SYSTEM FOR TILING WINDOWS BASED ON PREVIOUS POSITION AND SIZE

TECHNICAL FIELD

The present invention relates to the field of computer graphics and, more particularly, to the arrangement of display windows on a computer screen.

BACKGROUND OF THE INVENTION

Operating systems and application programs often include a graphical user interface for interfacing with users. Such a graphical user interface displays information within one or more display windows on a computer screen. A display window is a specific sub-area within the entire display area of the computer screen, or is the entire display area itself. The graphical user interface allows users to create one or more display windows corresponding to one or more different tasks. Once the display windows have been created, the user can position the display windows in different parts of the computer screen using an input device such as a mouse or keyboard. The user then chooses different tasks to perform by selecting from among the different display windows in the different parts of the computer screen.

When multiple display windows are created as described above, the display windows may overlap on the computer screen. When the display windows overlap, a portion of one or more of the display windows becomes unreadable, and the use of the display windows becomes difficult. Although the user can reposition and/or resize the display windows using the input device, this requires an unwelcome interruption of the user's activities to select positions and sizes for the display windows. Further, to avoid overlaps among the display windows and still maximize the use of the display area, the user may find it necessary to reposition and resize a number of display windows until their borders are closely adjacent and they take up most of the screen.

Accordingly, existing graphical user interfaces provide a feature called "tiling". Tiling involves the automatic aligmnent of the display windows on the computer screen so that they fill the entire display area and their borders touch. An example of a conventional tiling method performed by an existing graphical user interface is illustrated in FIGS. 1 and 2. FIG. 1 shows a typical display screen defining an arrangement in which three display windows are displayed on a computer screen. As shown, display windows A–C are provided on the display screen. It is to be assumed that display windows A–C were accessed by the user in alphabetical order. That is, display window C was most recently accessed, display window B was accessed before display window C, and display window A was accessed first.

When the user provides a request to the graphical user interface to "tile" the display windows of FIG. 1, the graphical user interface redraws display windows A–C in the conventional fashion shown in FIG. 2. This conventional method divides the display area by the number of display windows currently defined by the user (three, in the instant case) and theta redisplays the display windows in equally sized portions of the display area. The conventional method displays the equally sized display windows in the order of their most recent use. Thus, as shown in FIG. 2, display window C is displayed in the left portion of the computer screen, display window B is displayed in the middle of the computer screen and display window A is displayed in the right portion of the computer screen.

Although the conventional tiling method described above provides a method of organizing the display windows and maximizing the use of the display area, the user may find the use of the display windows to be awkward. One reason is that the user may have intentionally created some display windows larger than other display windows. For example, the user may have sized the display windows based on a preference or necessity of viewing the information displayed.

Another reason the user may find the conventional tiling method awkward is that the user may have positioned the display windows based on an intentional methodology. For example, the user may have placed the most frequently used or most important display window in a central part of the display screen. The conventional tiling method destroys this arrangement. Further, even if the user has not intentionally created such an arrangement or size distinction as described above, the user may have become accustomed to the sizes and locations of all of the display windows. Tiling the display windows in the conventional fashion described above destroys this familiarity. As such, the resulting ease of access of the display windows by the user is lost.

SUMMARY OF THE INVENTION

The present invention provides a computer method and system for arranging display windows on a display area of a computer screen. The invention arranges the display windows according to the position of each display window with respect to a linear section of the display area. Preferably, the invention arranges the display windows such that they completely fill the display area without any overlap between display windows. In addition, the invention preferably arranges the display windows in a fashion that approximately maintains the relative position and size of the display windows. As a result, the invention removes all overlaps between windows without destroying the relative positive and size of the display windows desired by a user.

The invention assigns each display window on the computer screen to a linear section based on a window position of the display window. In a first embodiment of the invention, the linear section is a horizontal row and each display window is assigned to a horizontal row based on a vertical window position of the display window. Each horizontal row extends horizontally across the computer screen display area and is given a row height approximately equal to an average height of the display windows assigned to that row. Each horizontal row is also given a vertical row position based on the vertical window positions of the display windows in the horizontal row. Preferably, each display window is assigned to a horizontal row by first selecting a vertically highest display window as a first key display window and assigning all display windows having a predetermined vertical proximity to the first key display window to the same horizontal row as the first key display window. Then, a next vertically highest display window not already assigned to a horizontal row is selected as a next key display window, and the process is repeated until all of the display windows have been assigned to a horizontal row.

In the first embodiment, the computer next arranges the horizontal rows to vertically and contiguously fill the computer screen display area. The horizontal rows are given new row heights of the same relative proportion as the row heights given above to the horizontal rows. Preferably, a total height of all the row heights is determined and each row height is scaled by an approximate ratio of the computer screen height to the total height of the row heights to obtain the new row heights. The horizontal rows are also given new vertical row positions to compensate for the new row heights. The new vertical row positions are in the same relative order as the vertical row positions given above to the horizontal rows.

Next, in the first embodiment, the computer arranges the display windows in each horizontal row to vertically fill the horizontal row. The computer then determines a window width of each display window and arranges the display windows in each horizontal row to extend horizontally across the horizontal row. The display windows are given new window widths of the same relative proportion as the window widths determined above and new horizontal window positions in the same relative order as the original horizontal window positions. Preferably, the computer determines the total width of the window widths of the display windows in each horizontal row and scales the window width of each display window in each horizontal row by an approximate ratio of the width of the computer screen display area to the total width to obtain the new window widths.

In an alternate embodiment of the invention, the computer performs actions similar to those described above except that the linear sections are vertical columns rather than horizontal rows. The computer assigns each display window on the computer screen to a vertical column based on a horizontal window position of the display window. Each vertical column vertically fills the computer screen display area and is given a column width approximately equal to an average width of the display windows assigned to that column. Each vertical column is also given a horizontal column position based on the horizontal window positions of the display windows in the vertical column. Preferably, each display window is assigned to a vertical column by first selecting a horizontally leftmost display window as a first key display window and assigning all display windows having a predetermined horizontal proximity to the first key display window to the same vertical column as the first key display window. Then, a next horizontally leftmost display window not already assigned to a vertical column is selected as a next key display window, and the process is repeated until all of the display windows have been assigned to a vertical column.

In the alternate embodiment, the computer next arranges the vertical columns to horizontally and contiguously fill the computer screen display area. The vertical columns are given new column widths of the same relative proportion as the column widths given above to the vertical columns. Preferably, a total width of all the column widths is determined and each column width is scaled by an approximate ratio of the width of the computer screen display area to the total width of the column widths to obtain the new column widths. The vertical columns are also given new horizontal column positions to compensate for the new column widths. The new horizontal column positions are in the same relative order as the horizontal column positions given above to the vertical columns.

Next, in the alternate embodiment, the computer arranges the display windows in each vertical column to horizontally fill the vertical column. The computer then determines a window height of each display window and arranges the display windows in each vertical column to vertically fill the vertical column. The display windows are given new window heights of the same relative proportion as the window heights determined above and new vertical window positions in the same relative order as the original vertical window positions. Preferably, the computer determines the total height of the window heights of the display windows in each vertical column and scales the window height of each display window in each vertical column by an approximate ratio of the height of the computer screen display area to the total height to obtain the new window heights.

DETAILED DESCRIPTION OF THE INVENTION

The present invention provides a computer method and system for arranging display windows on a display area of a computer screen. The invention arranges the display windows according to the position of each display window with respect to a linear section of the display area. In one embodiment, the linear sections are horizontal rows and in another embodiment, the linear sections are vertical columns. The invention removes any overlaps between display windows, thereby allowing each display window to be viewed in its entirety. Preferably, the invention arranges the display windows such that the relative size and position of each display window is maintained approximately. As a result, the invention rearranges the display windows so that the full portion of each display window can be seen without destroying the desired sizes and positions of the display windows relative to each other.

Figure 1:
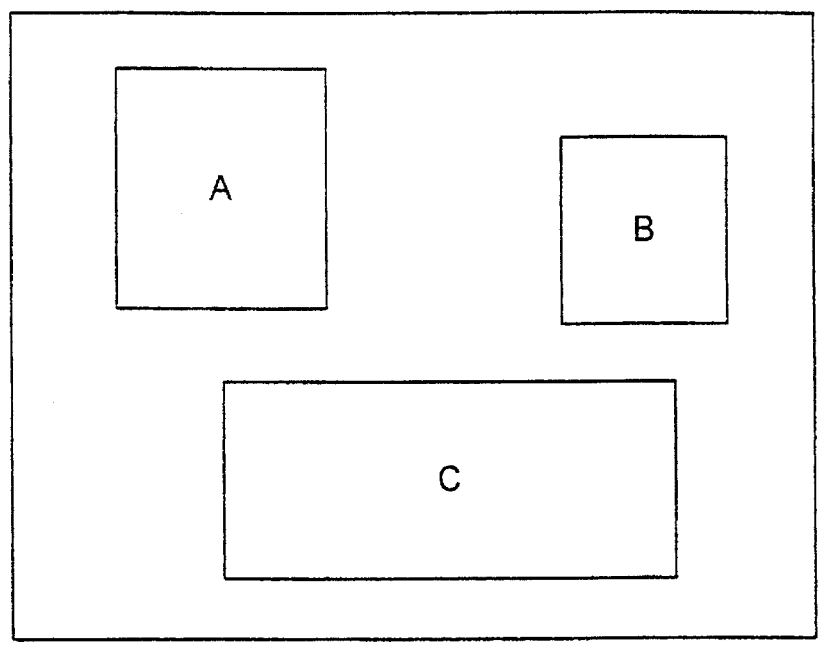
FIG. 1 is a diagram of a computer screen display area showing display windows in untiled form.
Figure 2:
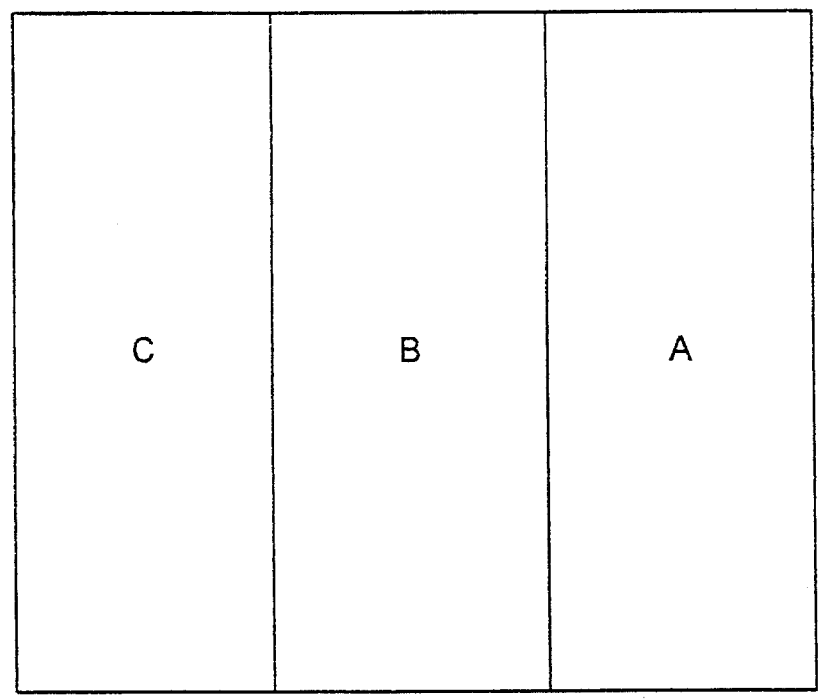
FIG. 2 is a diagram of a computer screen display area showing display windows tiled according to the prior art.
Figure 3:
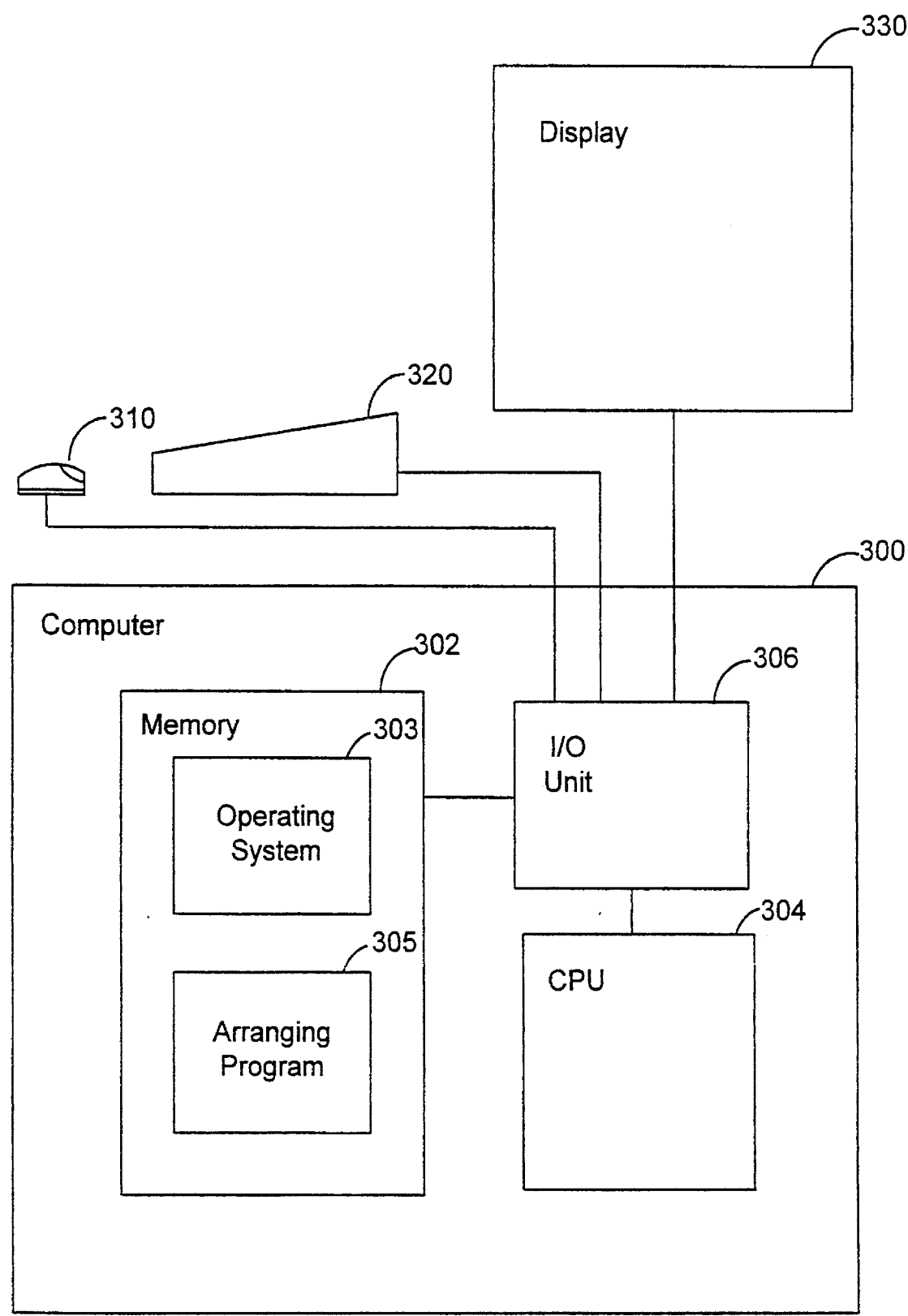
FIG. 3 is a partial block diagram of a computer used to tile display windows according to the present invention.

A computer system suitable for performing a preferred embodiment of the invention is shown in FIG. 3. The computer system of FIG. 3 includes a computer 300 which maintains the coordinates of the display windows and performs calculations on those coordinates to arrange the display windows. The computer system of FIG. 3 also includes a mouse 310 and a keyboard 320 with which a user defines and manipulates the display windows. The computer system of FIG. 3 further includes a display 330 that includes the computer screen on which the display windows are displayed. The computer screen includes a display area that preferably can be adjusted to fill all or part of the computer screen.

The computer 300 has a memory 302, a central processing unit (CPU) 304 and an I/O (input/output) unit 306. The memory 302 stores an operating system 303 that is executed by the CPU 304 to provide an interface to the computer hardware. In the preferred embodiment of the invention, the operating system executed by the CPU 304 is the Microsoft WINDOWS operating system, created by Microsoft Corporation of Redmond, Washington. The Microsoft WINDOWS operating system is described in "Programming Windows," written by Charles Petzold and published by Microsoft Press, which is hereby incorporated by reference. The Microsoft WINDOWS operating system includes a graphical user interface that creates and arranges display windows displayed on the display 330 based on input and coordinates defined by the user using the mouse 310 or keyboard 320 via the I/O unit 306.

The memory 302 also contains an arranging program 305 that performs the method of the preferred embodiment when executed by the CPU 304. When the user requests via the mouse 310 or the keyboard 320 that the existing display windows be arranged, the Microsoft WINDOWS operating system causes the CPU 304 to execute the arranging program to arrange the display windows. As will be explained, the arranging program arranges the display windows in a fashion that approximates the relative position and size of the display windows when the user request is made. The arranging program arranges the display windows by calculating new coordinates of the display windows and providing the new coordinates to the Microsoft WINDOWS operating system. The Microsoft WINDOWS operating system then displays the arranged display windows via the I/O unit 306 on the display 330 based on the new coordinates.

Figure 4:
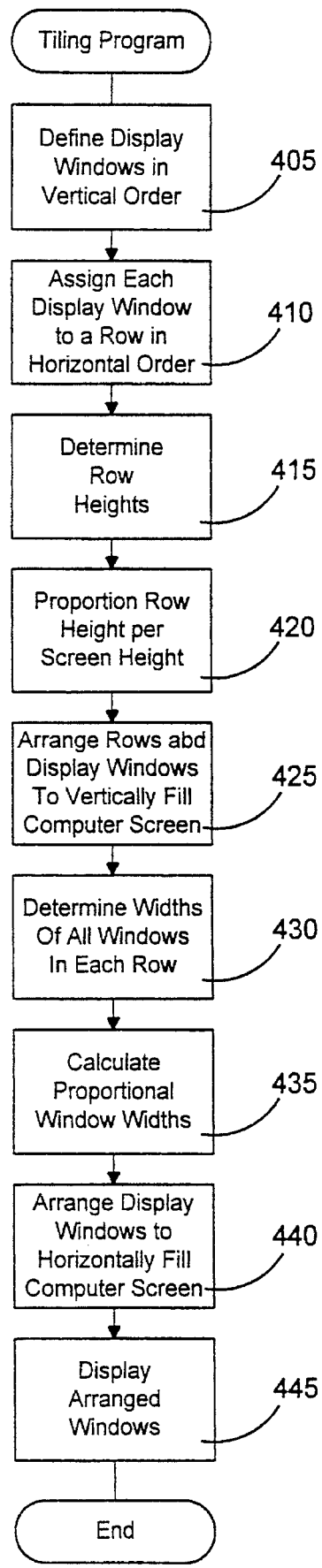
FIG. 4 is an overview flow diagram of a preferred tiling method according to the present invention.
Figure 5:
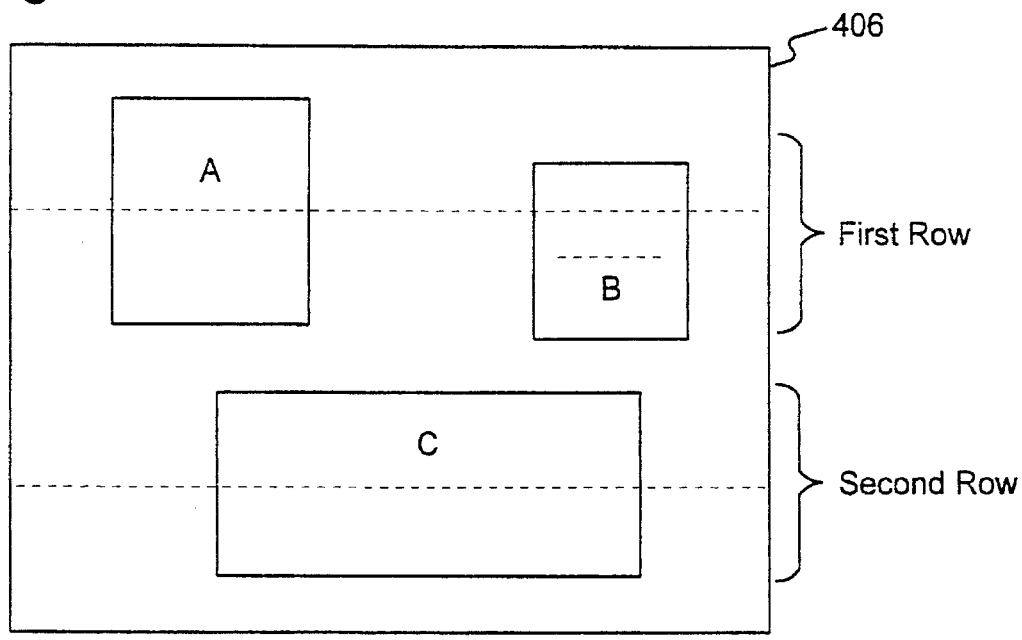
FIG. 5 is a diagram of a computer screen showing display windows in untiled form.

An overview flow diagram of the arranging program 305 that performs the method of the preferred embodiment is shown in FIG. 4. In step 405, the arranging program initially defines the display windows. The arranging program defines the display windows by obtaining the coordinates of the display windows from the Microsoft WINDOWS operating system and storing the coordinates in a data structure in the memory 302, which will be explained in more detail below. The Microsoft WINDOWS operating includes a function known as GetWindowRect that provides the coordinates of the display windows. Preferably, the display windows are defined by storing the coordinates in a vertical order. For example, FIG. 5 shows a computer screen display area 406 on which display windows A, B, and C are displayed with display window A being vertically highest and display window C being vertically lowest. As a result, display window A is stored first, display window B is stored next and display window C is stored last. The preferred implementation of step 405 will be described in greater detail below in connection with FIG. 7.

It should be understood that, in steps 410 through 440 below, references to the display windows refer to the stored coordinates that represent the display. In the preferred embodiment, the display windows are not displayed again until step 445, when the arranging of the display windows has been completed.

In step 410, the arranging program assigns each display window to a horizontal row based on the vertical position of the display window on the computer screen. The horizontal row can be either a predefined portion of the computer screen or, preferably, a portion that varies according to the positions of the display windows. The arranging program assigns the display windows to each horizontal row in horizontal, left-to-right order. For example, display windows A and B shown in FIG. 5 are both assigned to a first horizontal row and display window C is assigned to a second horizontal row. In FIG. 5, the first horizontal row extends front the top of display window A to the bottom of display window B, but the invention would also work with a horizontal row that is predefined to encompass the entire upper half of the computer screen. Within the first horizontal row, display window A is assigned first and display window B is assigned second because display window A is left of display window B. The specific implementation and criteria for assigning the display windows to the horizontal rows will be described in greater detail below in connection with FIG. 9.

In step 415, the arranging program determines the row height of each horizontal row based on the average height of all display windows in the horizontal row. For example, the row height of the first horizontal row in FIG. 5 is the average of the heights of display window A and display window B. The row height of the second horizontal row is the height of display window C. The specific implementation of step 415 will be explained in more detail below in connection with FIG. 10.

In step 420, the arranging program vertically proportions the row heights of the horizontal rows determined in step 415 based on the height of the computer screen display area. The vertical order of the horizontal rows is maintained. In vertically proportioning the row heights, the arranging program adjusts the row heights such that the horizontal rows vertically and contiguously span the computer screen display area, while maintaining the row heights in the same proportion relative to each other. Each row height is scaled by an approximate ratio of the height of the computer screen display area to the total of all of the row heights. For example, if the row height of the first horizontal row is twice the row height of the second horizontal row and the computer screen display area is 300 pixels high, then the row height of the first row is adjusted to be 200 pixels and the row height of the second row is adjusted to be 100 pixels high. Step 420 will be explained in more detail below in connection with FIG. 11.

Figure 6:
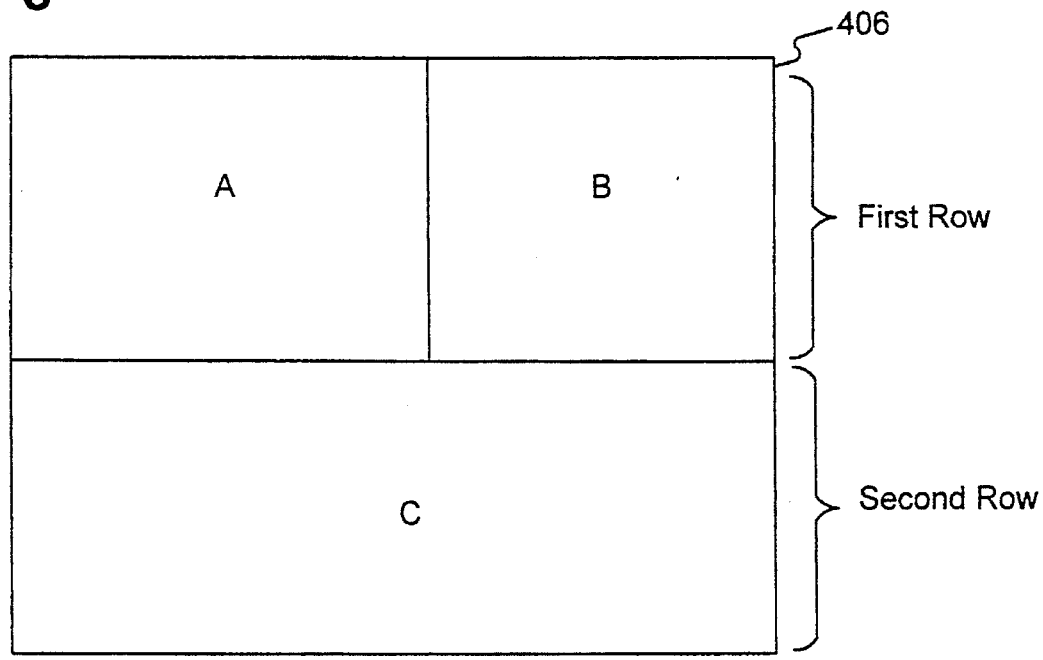
FIG. 6 is a diagram of a computer screen showing display windows tiled according to a preferred embodiment of the present invention.

In step 425, the arranging program arranges the display windows in each horizontal row to vertically fill that horizontal row. For example, the display windows A and B of the first horizontal row are arranged to vertically fill the first horizontal row, also as shown in FIG. 6. Steps 420 and 425 result in the horizontal rows vertically and contiguously filling the display area, and the display windows vertically filling the horizontal rows. Step 425 will be explained in more detail below in connection with FIG. 12.

In step 430, the arranging program determines a window width of each display window in each horizontal row, and in step 435, the arranging program calculates a proportional window width for each display window based on the width of the computer screen display area. Then, in step 440, the arranging program adjusts the coordinates of the display windows using the proportional window widths calculated in step 435 such that the display windows horizontally and contiguously span their horizontal row while maintaining the window widths in the same proportion relative to each other. The horizontal order of the display windows is also maintained. For example, in the first horizontal row in FIG. 6, the display window A is arranged to be horizontally contiguous with the display window B while remaining to the left of display window B as it was in FIG. 5. Steps 430, 435 and 440 are explained in greater detail below in connection with FIGS. 13, 14, and 15, respectively.

In step 445, the arranging program displays the arranged display windows. The arranging program displays the arranged display windows by providing the coordinates calculated in arranging the display windows to the Microsoft WINDOWS operating system stored in the memory 302. The coordinates of each of the display windows are provided to the Microsoft WINDOWS operation system preferably using a WINDOWS function known as SetWindowPos, although other functions are also available for the same purpose. Based on the coordinates provided, the graphical user interface in the Microsoft WINDOWS operating system provides the necessary input to the display 330 to display the arranged display windows.

Figure 7:
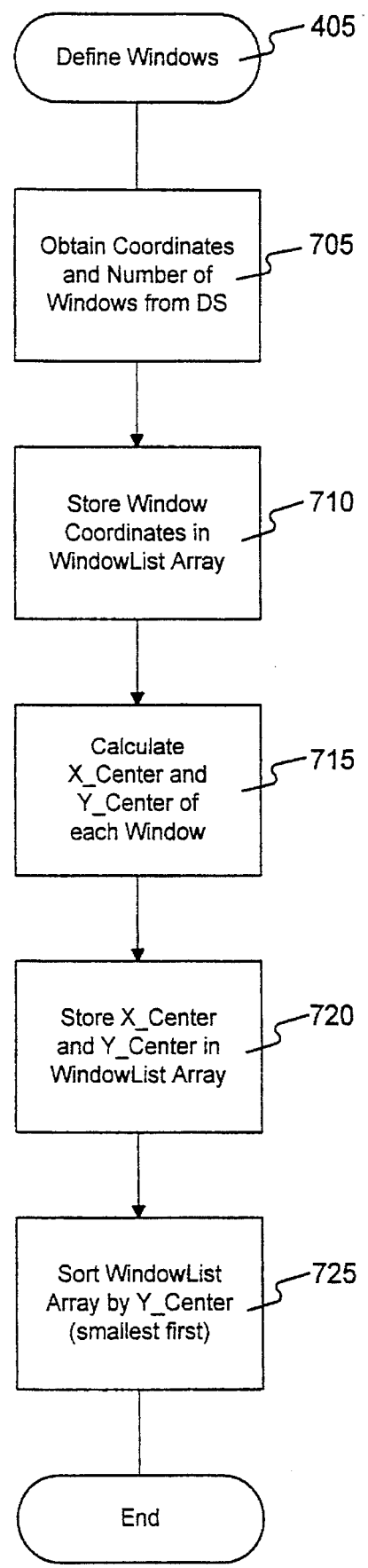
FIG. 7 is a detailed flow diagram of the Define Display Windows step of FIG. 4.
Figure 8:
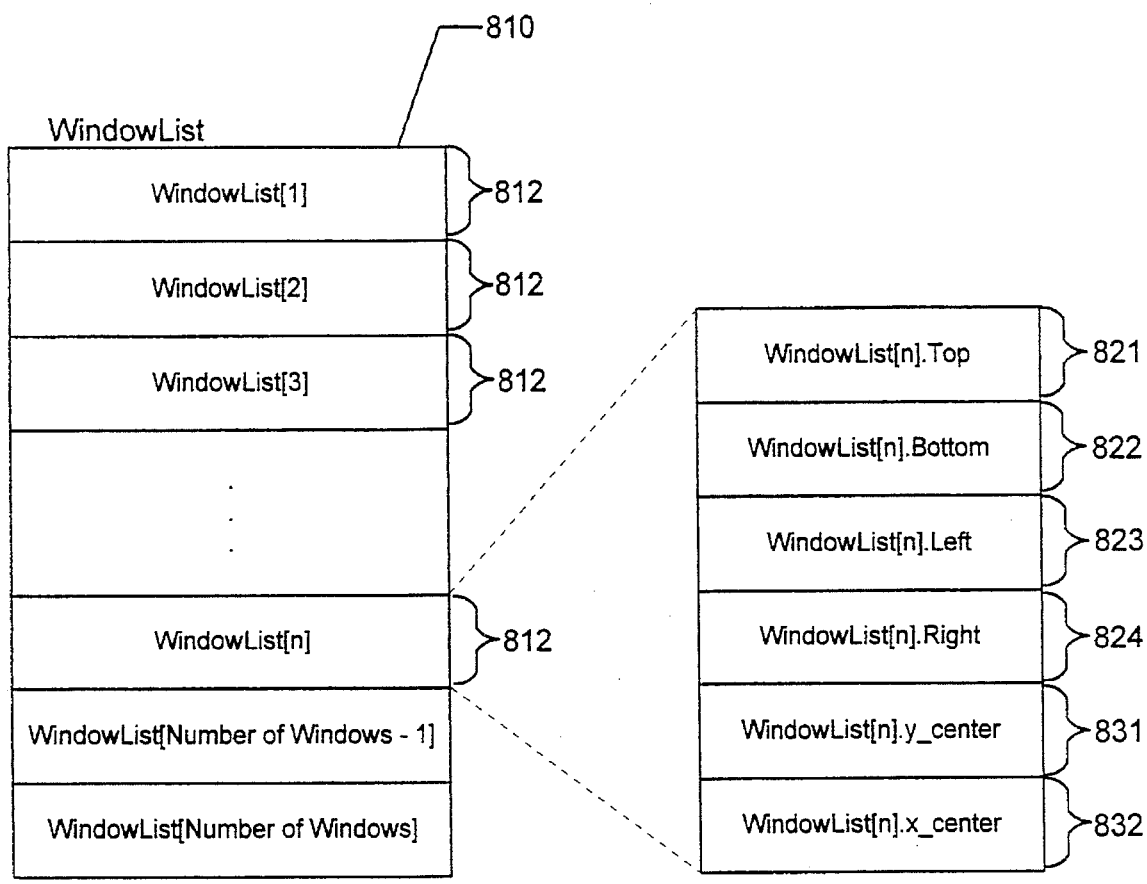
FIG. 8 is a block diagram of memory data structures used in accordance with the filing method of FIG. 4.

The process of defining the display windows referred to in step 405 of FIG. 4 is illustrated by the flow diagram labeled "Define Windows" in FIG. 7. In step 705, the Define Windows process obtains the number (NumberOfWindows) and coordinates (Top, Bottom, Right and Left) of the display windows from the Microsoft WINDOWS operating system. In step 710, the Define Windows process stores the window coordinates in a WindowList array 810, as shown in FIG. 8. There is an entry record 812 in the WindowList array 810 for each of the display windows displayed on the computer screen. The entry record 812 for display window n (n is between 1 and NumberOfWindows) includes a WindowList [n] that identifies the coordinates of the display window n. The WindowList[n] contains the coordinates WindowList [n]. Top 821 of the top side, WindowList[n].Bottom 822 of the bottom side, WindowList[n].Left 823 of the left side and WindowList[n].Right 824 of the right side of display window n.

Returning to FIG. 7, the Define Windows process calculates the x and y coordinates of the center of each display window in step 715. In step 720, stores the calculated coordinates in the WindowList[n] 820 (FIG. 8) for each display window n. The y coordinate of the center of the display window n is stored as WindowList[n].y_center 831 and the x coordinate of the center of the display window is stored as WindowList[n].x_center 832. The center coordinates are calculated as follows:

WindowList[n].y_center=(WindowList[n].Top +WindowList[n].Bottom)/ 2

WindowList[n].x_center=(WindowList[n].Left +WindowList[n].Right)/2.

In step 725, the Define Windows process sons the WindowList array 810 by WindowList[n].y_center 831. That is, WindowList[1 ].y_center has the smallest value (is vertically highest), WindowList[2].y_center has the next smallest value, and so on. WindowList[NumberOfWindows].y_center has the largest value (is vertically lowest). The Define Windows process then is complete.

The next step is to assign each display window to a horizontal row. All display windows within a predetermined vertical proximity to the first display window in the horizontal row ("key" window) are assigned to the same horizontal row. The first display window that is not within the predetermined vertical proximity is assigned as the key window of the next row.

Figure 9:
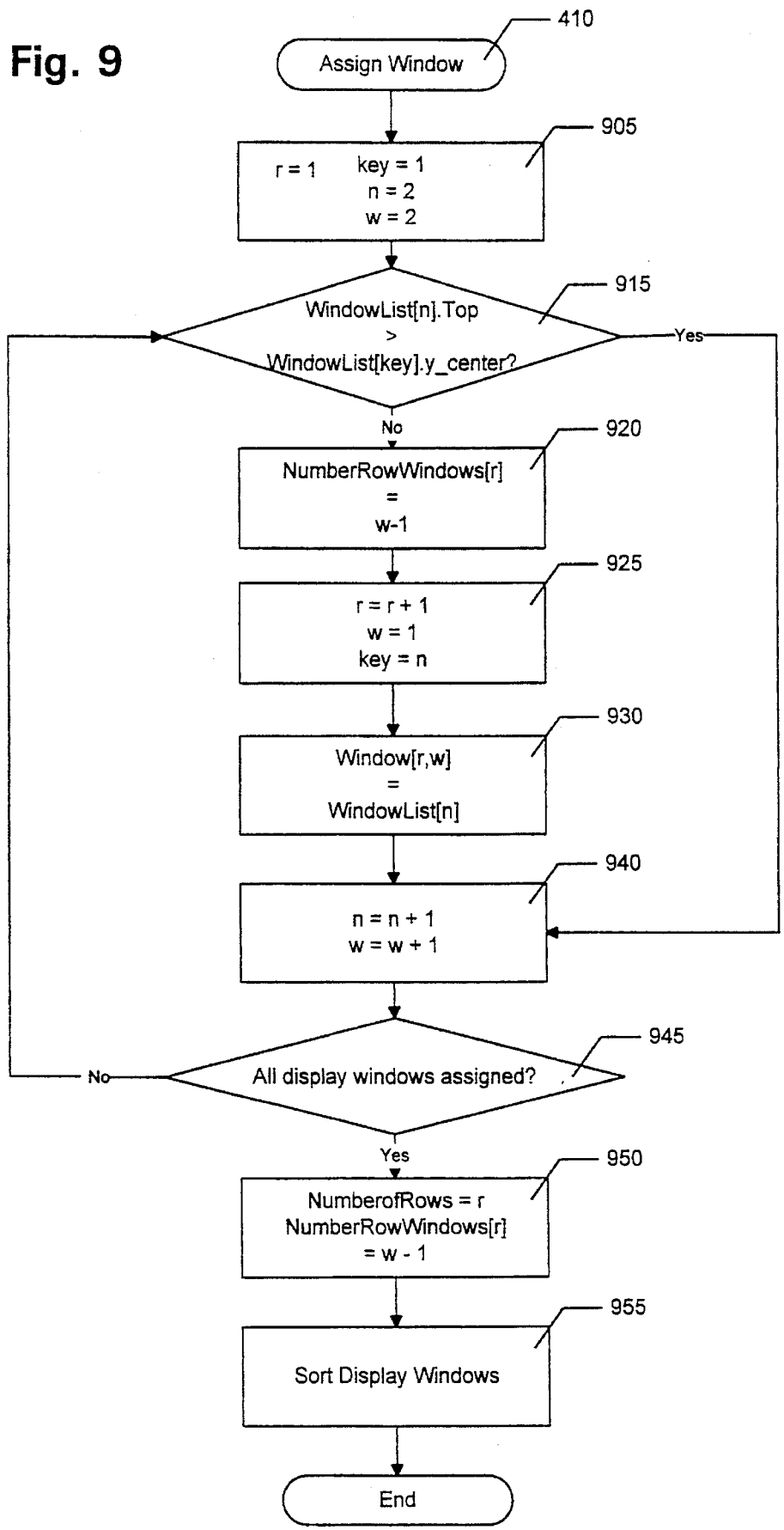
FIG. 9 is a detailed flow diagram of step 410 of FIG. 4.

The process of assigning each display window to a horizontal row in step 410 of FIG. 4 is illustrated by the flow diagram labeled "Assign Window" in FIG. 9. The Assign Window process creates a two-dimensional "Window" array of entries referring to the WindowList[n]records for the display windows. The first dimension (r) of the Window array indicates the horizontal row to which the display window is assigned and the second dimension (w) uniquely identifies the display window within the horizontal row (Window[r,w]). Therefore, each entry (Window[r,w]) of the Window array refers to a corresponding WindowList[n] entry 812 (FIG. 8). In other words, Window[r,w].Top refers to WindowList[n].Top, Window[r,w].Bottom refers to WindowList[n].Bottom, etc.

As described above, the preferred embodiment assigns display windows to a horizontal row based on their vertical proximity to a "key" window. In step 905, the Assign Window process initializes the first dimension r to be the first horizontal row (i.e., r=1), initializes the key window (key) to 1 to identify the first display window, and sets n and w are to 2 to identify the next display window. The key window is initially the highest (n =1) display window and assigned to the first horizontal row (r=1) as shown in step 905. All display windows within a predetermined vertical proximity to the key display window are assigned to the same horizontal row (initially r=1). The next highest display window not within the predetermined proximity (and, thus, not yet assigned to a horizontal row) will be assigned as the next key window for the next row, and the process is then repeated.

In the preferred embodiment, the determination of vertical proximity of each display window to the key window is based on whether the top side of the display window is higher than the center of the key window. Thus, in step 915, the Assign Window process determines whether the top of display window n is higher than the center of the key window based on whether the following relationship is true:

WindowList[n].Top<WindowList[key].y_center

If the Assign Window process determines in step 915 that the top of display window n is not higher than the center of the key display window, then control branches to step 920. In step 920, the Assign Window process calculates and stores a value NumberRowWindows[r]equal to the number of display windows in the row r (NumberRowWindows[r]=w−1). In step 925, display window n is assigned to be the next key window (key=n). In addition, step 925 increments the horizontal row r to which display windows will next be assigned (r=r+1) and updates the display window identifier w to equal 1. In step 930, the Window array entry Window [r,w]is set equal to the appropriate WindowList array entry WindowList[n]. In step 940, n and w are incremented to refer to the next display window. If the Assign Window process determines in step 915 that the top of display window n (WindowList[n].Top) is higher than the center of the key display window (WindowList[key].y_center), then control proceeds directly to step 940. In that case, the current display window n is added to the current horizontal row r and the next display window (n+1) is considered.

In step 945, the Assign Window process determines whether all of the display windows have been assigned to a horizontal row. If not, control loops to step 915 and the next display window n is assigned to a horizontal row as described above. If all of the display windows have been assigned, however, control proceeds to step 950. In step 950, the number of display windows (w−1) in the current horizontal row (r) is calculated and stored as NumberRowWindows[r] and the total number of horizontal rows r to which display windows were assigned is recorded as "NumberOfRows." Finally, in step 955, the display windows within each horizontal row are sorted by their horizontal position. That is, the first display window (w=1) in each horizontal row r has the smallest (leftmost) Windows[r,w].x_center, the second display window (w−2) has the next smallest WindowList[n].x_center, and so on. The Assign Windows process is then complete.

In the preferred embodiment, the display windows are assigned to horizontal rows on a top-down basis beginning with the vertically highest display window. In an alternative embodiment, the display windows are assigned to horizontal rows according to a bottom-up approach beginning with the vertically lowest display window.

Figure 10:
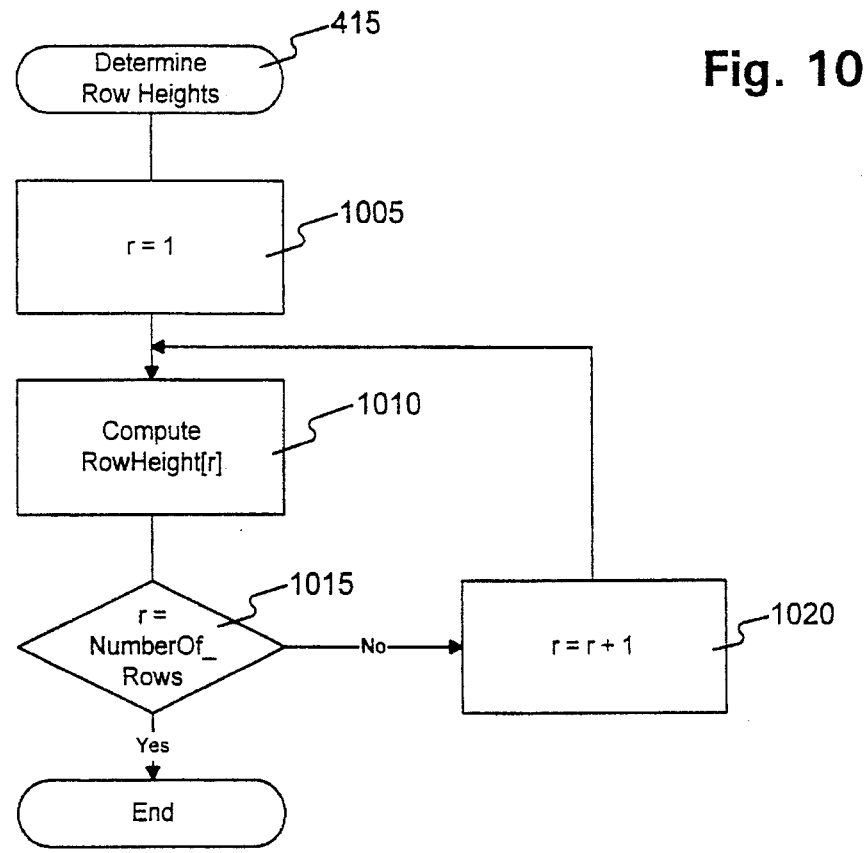
FIG. 10 is a detailed flow diagram of step 415 of FIG. 4.

The process of determining the row heights of the horizontal rows in step 415 of FIG. 4 is illustrated by the flow diagram labeled "Determine Row Heights" in FIG. 10. The Determine Row Heights process determines the height of each horizontal row based in the average height of the display windows in the horizontal row. In step 1005, the horizontal rows are initialized to the first horizontal row r=1. In step 1010, the row height "Row Height[r]" of horizontal row r is computed as follows:

$$\sum_{w=1}^{NumberRowWindow[r]} \frac{(Window[r,w] \cdot Bottom - Window[r,w] \cdot Top)}{NumberRowWindows[r]}$$

Then, in step 1015, the Determine Row Heights process determines whether the row heights have been computed for all of the horizontal rows. If not, control branches to step 1020 where the horizontal row r is incremented and control then loops to step 1010. If the row heights have been computed for all of the horizontal rows, the Determine Row Heights process ends.

Figure 11:
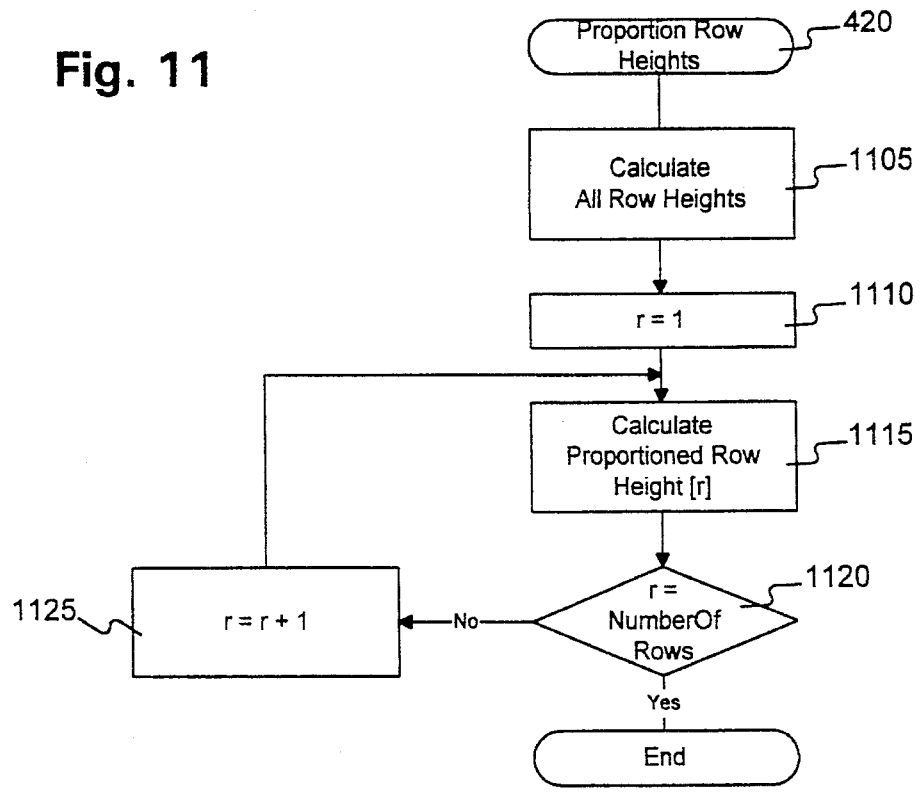
FIG. 11 is a detailed flow diagram of step 420 of FIG. 4.

The process of proportioning the row heights based on the computer screen height in step 420 of FIG. 4 is illustrated by the flow diagram labeled "Proportion Row Heights" in FIG. 11. The Proportion Row Heights process adjusts the height of each horizontal row based on the height of the computer screen display area such that the total height of the horizontal rows is the height of the computer screen display area. In step 1105, the Proportion Row Heights process initially calculates the total height "AllRowHeights" of all the row heights as follows:

$$\sum_{r=1}^{NumberofRows} RowHeight[r]$$

In step 1110, the horizontal rows are initialized to the first horizontal row r=1. Then, in step 1115, the row height is proportioned by calculating the "ProportionedRowHeight [r]" as follows:

RowHeight[r]×ScreenHeight/AllRowHeights, where ScreenHeight is the height of the computer screen display area. In step 1120, the Proportion Row Heights process determines whether the proportioned row heights of all of the horizontal rows has been calculated. If not, control branches to step 1125, where the horizontal row r is incremented and control then loops to step 1115. If the proportioned row heights of all horizontal rows have been calculated, the process then ends.

Figure 12:
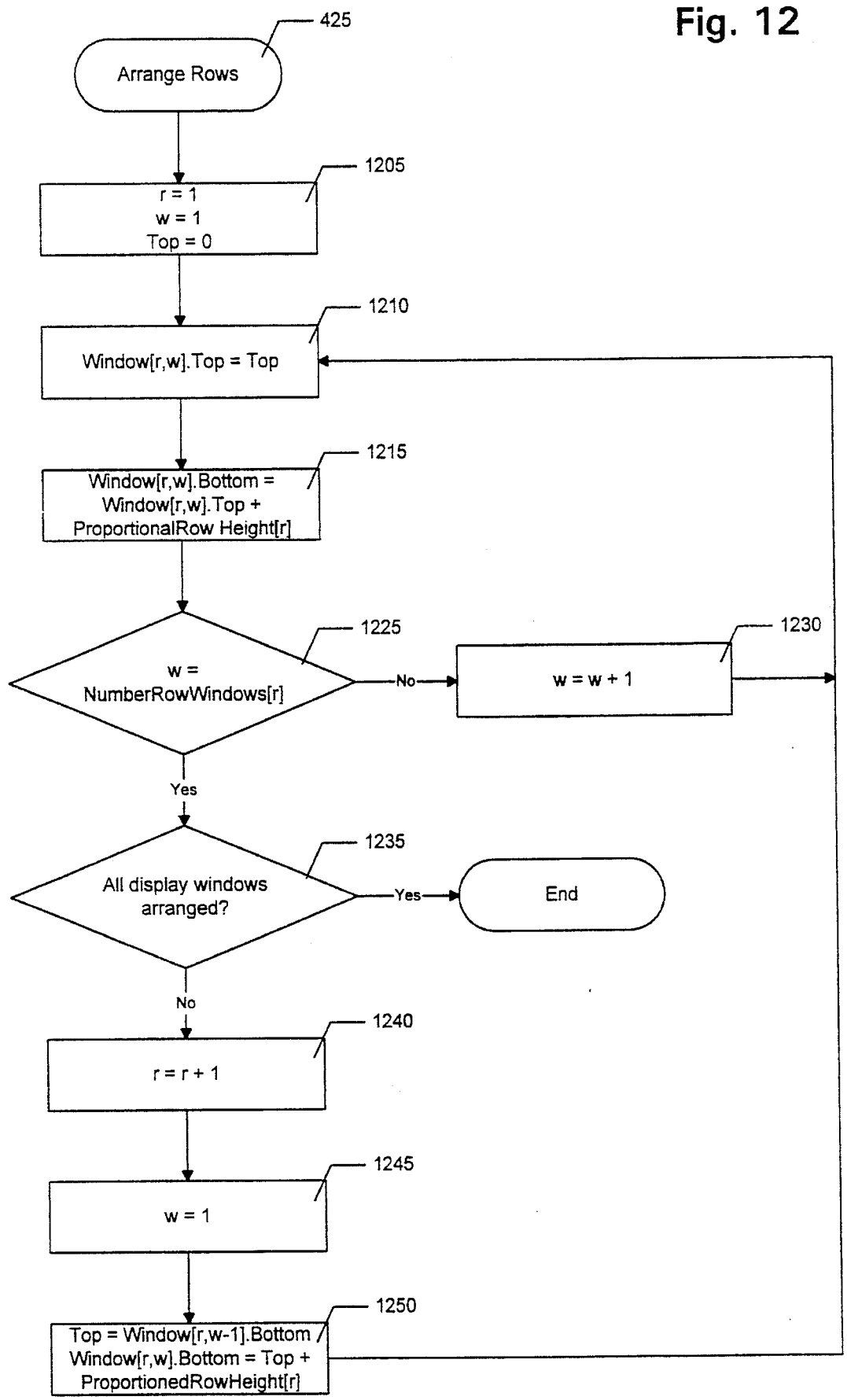
FIG. 12 is a detailed flow diagram of step 425 of FIG. 4.

The process of arranging the rows vertically in step 425 of FIG. 4 is illustrated by the flow diagram labeled "Arrange Rows" in FIG. 12. The Arrange Rows process arranges the horizontal rows to vertically and contiguously span the computer screen display area. In step 1205, the horizontal row r and the display window w within the horizontal row r are initialized to 1 and the value of "Top", which will be explained below, is initialized to 0. In step 1210, the top of the display window Window[r,w] is set to the current value of "Top". For example, the top of the first display window Window[1,1] is set to 0, the initial value of Top. Control then proceeds to step 1215, where the bottom of the display window Window[r,w] is set to the proportioned row height of the horizontal row r added to the top of the display window Window[r,w]. It will be appreciated that height values begin at the top of the computer screen display area and increase downwardly such that the bottom of each display window has a larger value than the top of that same display window.

Control then proceeds to step 1225, where the Arrange Rows process determines whether all of the display windows w in the horizontal row r have been arranged (w=NumberRowWindows [r]). If not, control branches to step 1230, which increments w and then loops back to the step 1210 to arrange the next display window w. If all of the display windows w in the horizontal row r have been arranged, then control proceeds to step 1235. In step 1235, the Arrange Rows process determines whether all of the horizontal rows have been arranged (r=NumberOfRows). If so, the Arrange Rows process ends. If not, however, control branches to step 1240. In step 1240, the horizontal row r is incremented and, in step 1245, the display window w is reset to 1. In step 1250, the "Top" value for the new horizontal row is set equal to the bottom value (Window(r−1,w).Bottom) of the previous horizontal row and a new bottom value (Window(r, w).Bottom) is calculated as the proportioned row height added to the Top value. This is also the top of the next horizontal row and, as a result, the next horizontal row is contiguous to the present horizontal row.

Figure 13:
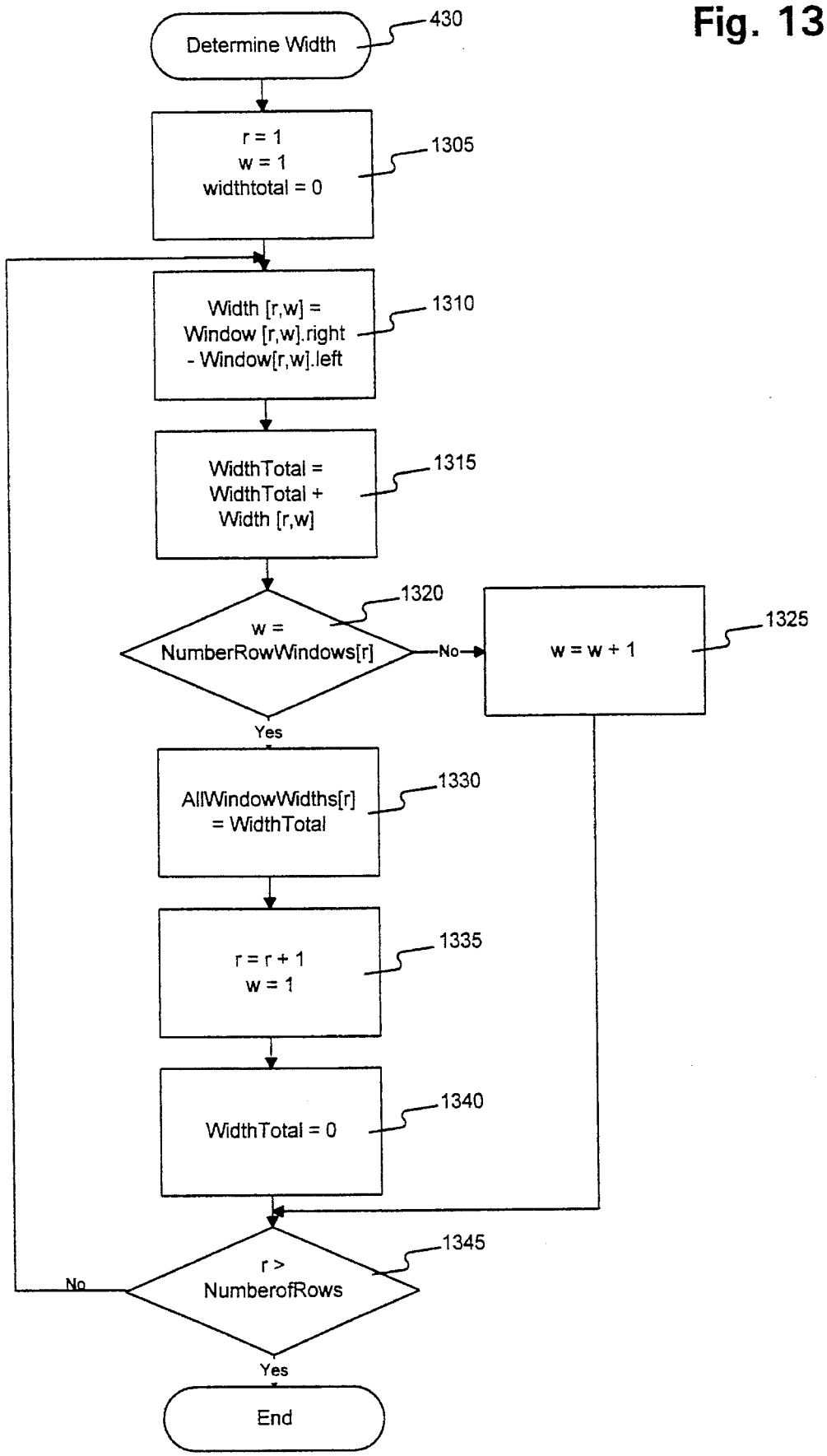
FIG. 13 is a detailed flow diagram of step 430 of FIG. 4.

The process of determining the width of each display window in step 430 of FIG. 4 is illustrated by the flow diagram labeled "Determine Width" in FIG. 13. In step 1305, the horizontal row r and display window w are initialized to 1 and a "WidthTotal" value is initialized to 0. In step 1310, the width of the window Window[r,w] is calculated as "Width[r,w]." In step 1315, the Width[r,w] is added to the current value of Widthtotal. Then, in step 1320, it is determined whether the widths of all of the display windows in the horizontal row r have been calculated. If the widths of all of the display windows in the horizontal row have not been calculated, then the w value is incremented in step 1325 and control proceeds to step 1345, which will be explained below.

If the Determine Widths process determines in step 1320 that the widths of all of the display windows in the horizontal row r have been calculated, control proceeds to step 1330. In step 1330, the total of the widths of all of the display windows in the horizontal row r is recorded as AllWindowWidths[r]. Control then proceeds to step 1335, where the horizontal row r is incremented and the display window w is reset to 1. In step 1340, the value of WidthTotal is reinitialized to 0. Control then proceeds to step 1345, where it is determined whether the widths of the display windows in all of the rows have been determined (r>NumberOfRows). If not, control loops back to step 1305. If so, the Determine Width process ends.

Figure 14:
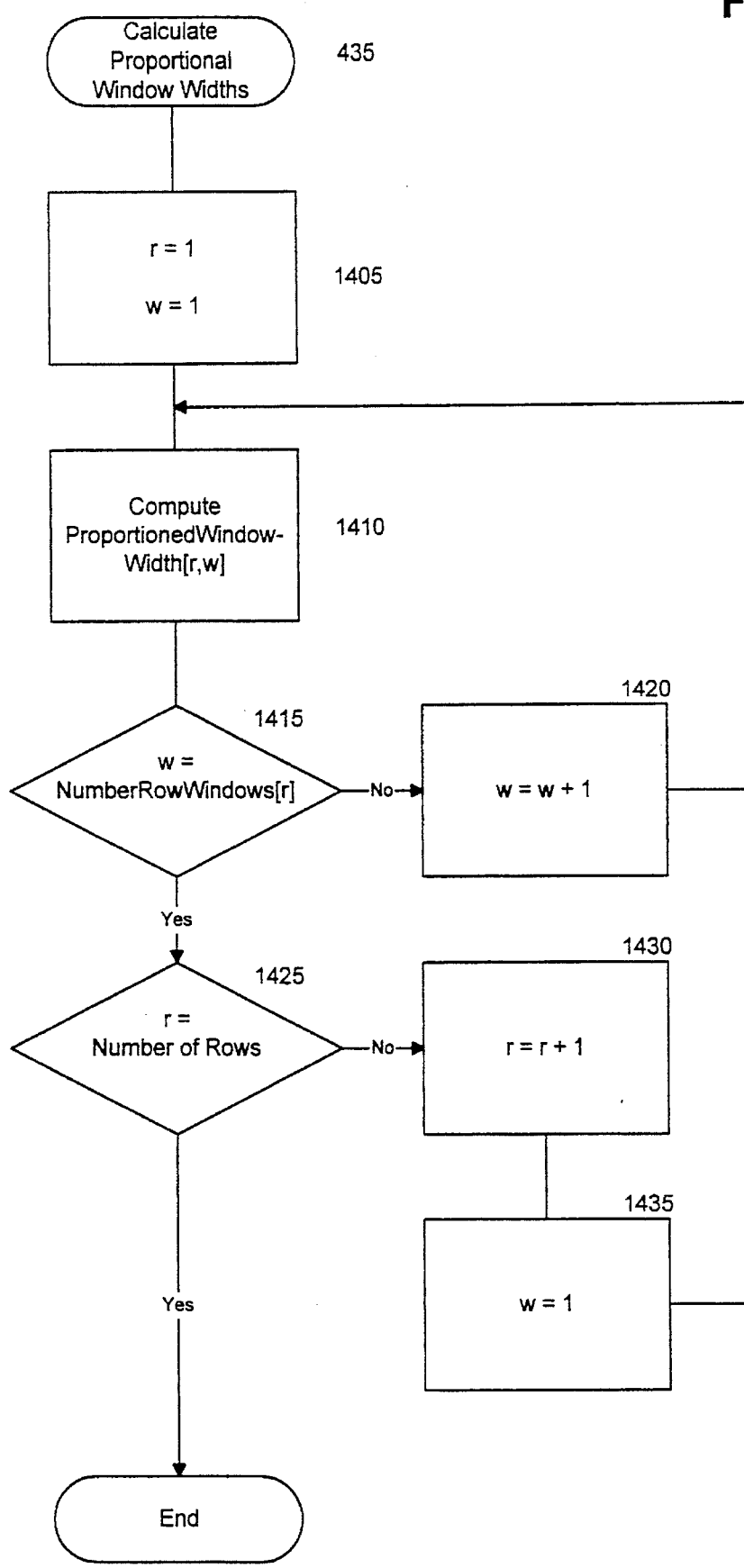
FIG. 14 is a detailed flow diagram of step 435 of FIG. 4.

The process of proportioning the display window widths in step 435 of FIG. 4 is illustrated by the flow diagram labeled "Proportion Window Widths" in FIG. 14. The Proportion Window Widths process adjusts proportionally the widths of the display windows in each horizontal row such that the total of the widths of all of the display windows in the horizontal row is equal to the width of the computer screen display area. In step 1405, the horizontal row r and display window w are initialized to 1. In step 1410, the Proportion Window Widths process computes the ProportionedWindowWidth[r,w] as follows:

Width[r]×ScreenWidth / AllWindowWidths[r], where ScreenWidth is the width of the computer screen display area. Then, in step 1415, the Proportion Window Widths process determines whether the widths of all display windows in the horizontal row r have been proportioned. If not, control branches to step 1420, where the display window w is incremented, and then control loops back to step 1410.

If, in step 1415, the Proportion Window Widths process determines that the widths of all of the display windows in the horizontal row r have been proportioned, then control proceeds to step 1425. In step 1425, the Proportion Window Widths process determines whether the widths of the display windows in all of the horizontal rows have been proportioned. If not, control proceeds to step 1430, where the horizontal row r is incremented. Control then proceeds to step 1435, where the display window w is reset to 1, and then control loops back to step 1410. If the Proportion Window Widths process determines in step 1425 that the widths of the display windows in all of the horizontal rows have been proportioned, then the process ends.

Figure 15:
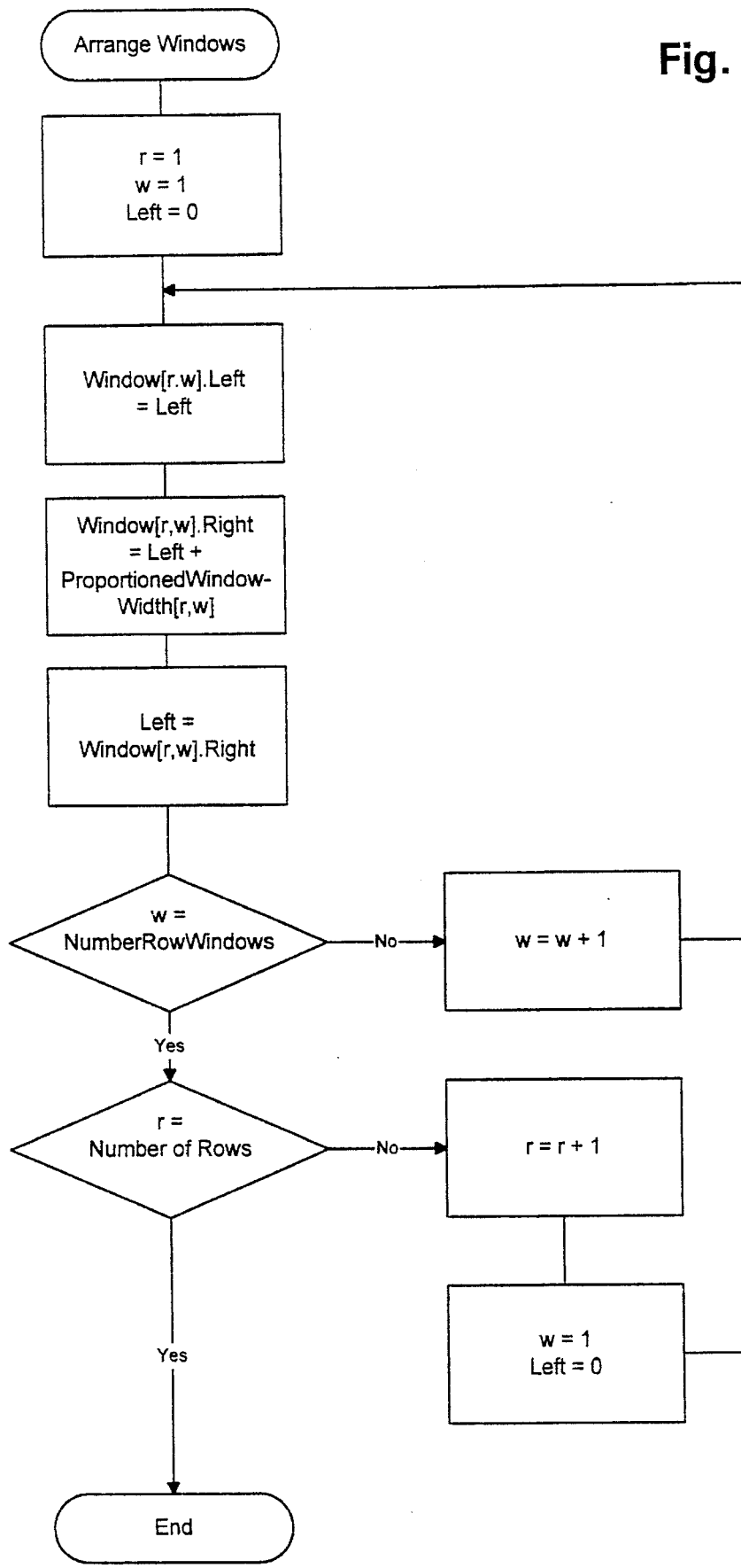
FIG. 15 is a detailed flow diagram of step 440 of FIG. 4.

The process of arranging the display windows in step 440 of FIG. 4 is illustrated by the flow diagram labeled "Arrange Windows" in FIG. 15. The Arrange Windows process arranges the display windows in each horizontal row to horizontally and contiguously span the computer screen display area. In step 1505, the horizontal row r and display window w are initialized to 1 and the value of "Left", which will be explained below, is initialized to 0. In step 1510, the left side of the display window Window[r,w] is set to the current value of "Left". For example, the left side of the first display window Window[1,1] is set to 0, the initial value of left. Control then proceeds to step 1515, where the right side of the display window Window[r,w] (Window[r,w].right) is set to the proportioned window width of the display window Window[r,w] added to the left value of the display window Window[r,w]. Then, in step 1520, the Arrange Windows process sets the next value of "Left" to be equal to the right side of Window[r,w].

Control then proceeds to step 1525, where the Arrange Windows process determines whether all of the display windows w in the horizontal row r have been arranged. If not, control branches to step 1530 to increment the display window w and then loops back to step 1510 to arrange the next display window w. If all of the display windows w in the horizontal row r have been arranged, control proceeds to step 1535. In step 1535, the Arrange Rows process determines whether the display windows in all of the horizontal rows have been arranged. If so, the Arrange Rows process ends. If not, however, control branches to step 1540. In step 1540, the horizontal row r is incremented and, in step 1545, the display window w is reset to 1 and "Left" is reset to be 0. Control then loops back to step 1510 for the new horizontal row r.

A preferred embodiment has been described wherein display windows are assigned to horizontal rows, the horizontal rows are arranged to fill the computer screen display area and the display windows within each horizontal row are arranged to fill the horizontal row. In an alternate embodiment of the invention, a similar method is performed wherein the display windows are assigned to vertical columns rather than horizontal rows.

In the alternate embodiment, the computer first assigns each display window on the computer screen to a vertical column based on a horizontal window position of the display window. Each vertical column vertically spans the computer screen display area and is given a column width approximately equal to an average width of the display windows assigned to that column. Each vertical column is also given a horizontal column position based on the horizontal window positions of the display windows in the vertical column. Preferably, each display window is assigned to a vertical column by first selecting a horizontally leftmost display window as a first key display window and assigning all display windows having a predetermined horizontal proximity to the selected key display window to the same vertical column as the selected key display window. Then, a next horizontally leftmost display window not already assigned to a vertical column is selected as a next key display window, and the process is repeated until all of the display windows have been assigned to a vertical column. Alternatively, each display window can be assigned to a vertical column by selecting a rightmost display window as the first key display window and continuing the method accordingly.

The computer next arranges the vertical columns to horizontally and contiguously span the computer screen display area. The vertical columns are given new column widths of the same relative proportion as the column widths given to the vertical columns above. Preferably, a total width of all the column widths is determined and each column width is scaled by an approximate ratio of the width of the computer screen display area to the total width of the column widths to obtain the new column widths. The vertical columns are also given new horizontal column positions in the same relative order as the horizontal column positions given to the vertical columns above.

Finally, in the alternate embodiment, the computer arranges each display window in each vertical column to horizontally traverse the vertical column, determines a window height of each display window and arranges the display windows in each vertical column to vertically span the computer screen display area. The display windows are given new window heights of the same relative proportion as the window heights determined above and new vertical window positions in the same relative order as the original vertical window positions. Preferably, the computer determines the total height of the window heights of the display windows in each vertical column and scales the window height of each display window in each vertical column by an approximate ratio of the height of the computer screen display area to the total height of the window heights to obtain the new window heights.

The alternate embodiment described above is implemented in the same way as the preferred embodiment as described with respect to FIGS. 4–15 above, except that the orientation is vertical rather than horizontal. One of ordinary skill in the art easily can adapt the description of the preferred embodiment to implement this alternate embodiment.

Although the present invention has been described with reference to one or more specific embodiments, it should be appreciated that various changes can be made by one of ordinary skill in the art without departing from the spirit of the invention. The scope of the invention is properly defined by the claims.

I claim:

1. A method, performed by a computer, of arranging display windows on a computer screen display area, comprising the steps of:

determining an old window position of each of a plurality of non-tiled display windows on the display area;

assigning each non-tiled display window to one of a plurality of non-overlapping horizontal rows based on the old window position of the non-tiled display window, each horizontal row having one or more display windows assigned thereto;

moving each of the non-tiled display windows to a new window position within the assigned horizontal row of the non-tiled display window such that no display window overlaps another display window and no display window extends beyond its assigned horizontal row; and displaying the moved display windows.

2. The method of claim 1 wherein the assigning step includes assigning all display windows having at least a predetermined vertical proximity to each other to the same horizontal row.

3. The method of claim 1, further comprising assigning a row size for each horizontal row based on window sizes of the display windows assigned to the horizontal row.

4. The method of claim 3, further comprising assigning a row position for each horizontal row based on the old window positions of the display windows assigned to the horizontal row.

5. The method of claim 1 further comprising:

arranging the horizontal rows to vertically and contiguously span the computer screen display area; and arranging the display windows to vertically and contiguously span each horizontal row.

6. The method of claim 1, further comprising arranging the display windows in each horizontal row to contiguously fill the horizontal row.

7. The method of claim 6 wherein the arranging the display windows step comprises:

(i) arranging each display window in each horizontal row to vertically traverse the horizontal row to which the display window is assigned, (ii) determining a window width of each display window, and (iii) arranging the display windows in each horizontal row to horizontally span the horizontal row.

8. The method of claim 7 wherein each display window has a window width and the arranging the display windows step further comprises:

(i) determining a total width of the window widths of the display windows in each horizontal row, and (ii) scaling the window width of each display window in each horizontal row by an approximate ratio of a width of the computer screen display area to the total width.

9. The method of claim 1 wherein each of the plurality of non-tiled display windows is an overlapping display window that either overlaps another display window or is overlapped by another display window.

10. The method of claim 1 wherein the plurality of non-tiled display windows includes an isolated display window that is spaced apart from all other display windows on the display area.

11. A method, performed by a computer, of arranging display windows on a computer screen display area, comprising the steps of:

assigning each display window to one of a plurality of horizontal rows based on a window position of the display window each horizontal row having one or more display windows assigned thereto, the assigning step including:

assigning each display window to a horizontal row based on a vertical window position of the display window, each display window also having a horizontal window position;

arranging each horizontal row to horizontally span the computer screen display area;

assigning each horizontal row a row height approximately equal to an average height of the display windows assigned to the horizontal row; and assigning each horizontal row a vertical row position based on the vertical window positions of the display windows in the horizontal row;

arranging the display windows such that no display window overlaps another display window and no display window extends beyond its assigned horizontal row; and displaying the arranged display windows.

12. The method of claim 11 wherein the step of assigning a display window to a horizontal row further comprises assigning to a same horizontal row as a first key display window all display windows having at least a predetermined vertical proximity to the first key display window.

13. The method of claim 12 wherein the step of assigning a display window to a horizontal row further comprises:

(i) selecting a vertically highest display window of a horizontal row as the first key display window, (ii) assigning all display windows having a predetermined vertical proximity to the first key display window to the same horizontal row, and (iii) selecting a next vertically highest display window not already assigned to a horizontal row as a next key display window and repeating steps (ii) and (iii) until all display windows have been assigned to a horizontal row.

14. The method of claim 12 wherein the step of assigning a display window to a horizontal row further comprises:

(i) selecting a vertically lowest display window of a horizontal row as the first key display window, (ii) assigning all display windows having a predetermined vertical proximity to the first key display window to the same horizontal row, and (iii) selecting a next vertically lowest display window not already assigned to a horizontal row as a next key display window and repeating steps (ii) and (iii) until all display windows have been assigned to a horizontal row.

15. A method, performed by a computer, of arranging display windows on a computer screen display area, comprising the steps of:

assigning each display window to one of a plurality of horizontal rows based on a window position of the display window, each horizontal row having one or more display windows assigned thereto;

arranging the display windows such that no display window overlaps another display window and no display window extends beyond its assigned horizontal row;

arranging the horizontal rows to vertically and contiguously span the computer screen display area by steps that include:

assigning each horizontal row a row height approximately equal to an average height of the display windows assigned to the horizontal row;

determining a total height of the row heights; and scaling each row height by an approximate ratio of a height of the computer screen display area to the total height to produce a new row height for each horizontal row; and displaying the arranged display windows.

16. A method, performed by a computer, of arranging display windows on a computer screen display area, comprising the steps of:

determining an old window position of each of a plurality of non-tiled display windows on the display area;

assigning each non-tiled display window to one of a plurality of non-overlapping vertical columns based on the old window position of the non-tiled display window, each vertical column having one or more display windows assigned thereto;

moving each of the non-tiled display windows to a new window position within the assigned vertical column of the non-tiled display window such that no display window overlaps another display window and no display window extends beyond its assigned vertical column; and displaying the moved display windows.

17. The method of claim 16 wherein the assigning step includes assigning all display windows having at least a predetermined horizontal proximity to each other to the same vertical column.

18. The method of claim 16, further comprising assigning a column size for each vertical column based on window sizes of the display windows assigned to the vertical column.

19. The method of claim 18, further comprising assigning a column position for each vertical column based on the old window positions of the display windows assigned to the vertical column.

20. The method of claim 16, further comprising:

arranging the vertical columns to horizontally and contiguously span the computer screen display area; and arranging the display windows to horizontally and contiguously span each horizontal row.

21. The method of claim 16, further comprising arranging the display windows in each vertical column to contiguously fill the vertical column.

22. The method of claim 21 wherein the arranging the display windows step comprises:

(i) arranging each display window in each vertical column to horizontally traverse the vertical column to which the display window is assigned, (ii) determining a window height of each display window, and (iii) arranging the display windows in each vertical column to vertically span the vertical column.

23. The method of claim 22 wherein each display window has a window height and the arranging the display windows step further comprises:

(i) determining a total height of the window heights of the display windows in each vertical column, and (ii) scaling the window height of each display window in each vertical column by an approximate ratio of a height of the computer screen display area to the total height.

24. The method of claim 16 wherein each of the plurality of non-tiled display windows is an overlapping display window that either overlaps another display window or is overlapped by another display window.

25. The method of claim 16 wherein the plurality of non-tiled display windows includes an isolated display window that is spaced apart from all other display windows on the display area.

26. A method, performed by a computer, of arranging display windows on a computer screen display area, comprising the steps of:

assigning each display window to one of a plurality of vertical columns based on a window position of the display window, each vertical column having one or more display windows assigned thereto, the assigning step including:

assigning each display window to a vertical column based on a horizontal window position of the display window, each display window also having a vertical window position;

arranging each vertical column to vertically span the computer screen display area;

assigning each vertical column a column width approximately equal to an average width of the display windows assigned to the vertical column; and assigning each vertical column a vertical column position based on the horizontal window positions of the display windows in the vertical column;

arranging the display windows such that no display window overlaps another display window and no display window extends beyond its assigned vertical column; and displaying the arranged display windows.

27. The method of claim 26 wherein the step of assigning a display window to a vertical column further comprises assigning to a same vertical column as a first key display window all display windows having at least a predetermined horizontal proximity to the first key display window.

28. The method of claim 27 wherein the step of assigning a display window to a vertical column further comprises:

(i) selecting a horizontally left-most display window of a vertical column as the first key display window, (ii) assigning all display windows having a predetermined horizontal proximity to the first key display window to the same vertical column, and (iii) selecting a next horizontally left-most display window not already assigned to a vertical column as a next key display window and repeating steps (ii) and (iii) until all display windows have been assigned to a vertical column.

29. The method of claim 27 wherein the step of assigning a display window to a vertical column further comprises:

(i) selecting a horizontally right-most display window of a vertical column as the first key display window, (ii) assigning all display windows having a predetermined horizontal proximity to the first key display window to the same vertical column, and (iii) selecting a next horizontally right-most display window not already assigned to a vertical column as a next key display window and repeating steps (ii) and (iii) until all display windows have been assigned to a vertical column.

30. A method, performed by a computer, of arranging display windows on a computer screen display area, comprising the steps of:

assigning each display window to one of a plurality of vertical columns based on a window position of the display windows, each vertical column having one or more display windows assigned thereto;

arranging the display windows such that no display window overlaps another display window and no display window extends beyond its assigned vertical column;

arranging the vertical columns to horizontally and contiguously span the computer screen display area by steps that include:

assigning each vertical column a column width approximately equal to an average width of the display windows assigned to the vertical column determining a total width of the column widths, and scaling each column width by an approximate ratio of a width of the computer screen display area to the total width to produce a new column width for each vertical column; and displaying the arranged display windows.

31. A method, performed by a computer, of arranging screen elements on a computer screen display area, comprising:

determining an old location of each of a plurality of screen elements, wherein each screen element of the plurality either overlaps another screen element or is spaced apart from each of the other screen elements of the plurality:

dividing the computer screen display area into a plurality of linear sections based on the old locations of the screen elements on the computer screen display area assigning each screen element of the plurality of screen elements to one of the linear sections based on the old location of the screen element; and arranging the screen elements in each of the arranged linear sections such that each screen element is contiguous with at least one other screen element, no screen element overlaps another screen element and no screen element extends beyond its assigned linear section.

32. The method of claim 31, further comprising the step of displaying the arranged screen elements.

33. The method of claim 31 wherein the assigning step comprises assigning all screen elements having at least a predetermined proximity to a key screen element to a same linear section as the key screen element.

34. The method of claim 31 wherein:

the assigning step includes assigning each screen element to one of a plurality of horizontal rows based on a vertical location of the screen element; and the method further includes:

arranging the horizontal rows to horizontally span the computer screen display area; and arranging the screen elements in each horizontal row of the arranged horizontal rows to fill each horizontal row.

35. The method of claim 31 wherein:

the assigning step includes assigning each screen element to one of a plurality of vertical columns based on a vertical location of the screen element; and the method further includes:

arranging the vertical columns to horizontally span the computer screen display area; and arranging the screen elements in each vertical column of the arranged vertical columns to fill each vertical column.

36. A computer system for arranging display windows on a computer screen display area, comprising:

a memory storing an arranging program including:

instructions for detecting an isolated display window that is spaced apart from all other display windows on the display area;

instructions for assigning each display window to a linear section based on a location of the display window, thereby creating one or more linear sections of display windows, instructions for arranging the linear sections to span the computer screen display area, and instructions for arranging the display windows in each linear section of the arranged linear sections such that the isolated display window is contiguous with at least one other display window and none of the display windows overlap another display window; and a processor executing the arranging program to arrange the display windows; and a display coupled to the processor and memory, the display including the computer screen display area and being adapted to receive and display the arranged display windows.

37. The computer system of claim 36 wherein the means for assigning each display window to a linear section comprises means for assigning all display windows having at least a predetermined proximity to a key display window to a same linear section as the key display window.

38. The computer system of claim 36 wherein each linear section is a horizontal row.

39. The computer system of claim 36 wherein each linear section is a vertical column.

40. A computer storage medium having executable computer instructions for arranging screen elements on a computer screen display area, the computer instructions causing the computer to:

determine an old screen element position of each of a plurality of overlapping screen elements on the display area;

assign each overlapping screen element to one of a plurality of non-overlapping linear sections based on the old screen element position, each linear section being assigned one or more of the overlapping screen elements;

move each of the overlapping screen element to a new screen element position within the assigned linear sections such that no screen element overlaps another screen element and no screen element extends beyond its assigned linear section; and display the moved screen elements.

41. The computer storage medium of claim 40 wherein each of the plurality of non-tiled display windows is an overlapping display window that either overlaps another display window or is overlapped by another display window.

42. The computer storage medium of claim 40 wherein the plurality of non-tiled display windows includes an isolated display window that is spaced apart from all other display windows on the display area.

43. The computer storage medium of claim 40 wherein the computer instructions cause the computer to assign all screen elements having at least a predetermined proximity to a key screen element to a same linear section as the key screen element.

44. The computer storage medium of claim 40 wherein the computer instructions cause the computer to:

assign each screen element to one of a plurality of horizontal rows based on a vertical location of the screen element;

arrange the horizontal rows to horizontally span the computer screen display area; and arrange the screen elements in each horizontal row of the arranged horizontal rows to fill each horizontal row.

45. The computer storage medium of claim 40 wherein the computer instructions cause the computer to:

assign each screen element to one of a plurality of vertical columns based on a vertical location of the screen element;

arrange the vertical columns to horizontally span the computer screen display area; and arrange the screen elements in each vertical column of the arranged vertical columns to fill each vertical column.

46. A method in a computer system for arranging windows on a display device, each window having a position and size that is relative to the positions and sizes of the other windows, the method comprising the steps of:

determining an old position and an old size of each of a plurality of windows that are arranged in a non-tiled manner on the display device; and rearranging the windows into a tiled manner by assigning a new position and size to each window within one of a plurality of linear sections of the display device so that each new position and new size of a window is assigned based on the old positions and old sizes.

47. The method of claim 46 wherein each of the plurality of linear sections is a horizontal row.

* * * * *